(12) United States Patent
Fukudome

(10) Patent No.: US 8,850,840 B2
(45) Date of Patent: Oct. 7, 2014

(54) DESICCANT AIR CONDITIONER

(75) Inventor: Jiro Fukudome, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 608 days.

(21) Appl. No.: 13/127,775

(22) PCT Filed: Oct. 23, 2009

(86) PCT No.: PCT/JP2009/068259
§ 371 (c)(1),
(2), (4) Date: May 5, 2011

(87) PCT Pub. No.: WO2010/053015
PCT Pub. Date: May 14, 2010

(65) Prior Publication Data
US 2011/0214446 A1    Sep. 8, 2011

(30) Foreign Application Priority Data
Nov. 7, 2008 (JP) .................. 2008-286611

(51) Int. Cl.
*F24F 12/00* (2006.01)
*F24F 3/14* (2006.01)
*F24F 3/153* (2006.01)
*F24F 3/147* (2006.01)

(52) U.S. Cl.
CPC .............. *F24F 3/147* (2013.01); *F24F 12/006* (2013.01); *F24F 2203/1052* (2013.01); *F24F 3/1423* (2013.01); *F24F 2203/1092* (2013.01); Y02B 30/16 (2013.01); *F24F 3/153* (2013.01)
USPC ......................................... 62/271

(58) Field of Classification Search
CPC ........... F25D 17/06; F25D 23/00; F24H 3/02; F25B 49/02; B01D 53/06; B01D 53/08; F24F 3/1423; F24F 12/006; F24F 3/153; F24F 2203/1092; F24F 2203/1052; F24F 3/1411; F24F 2300/1464; F24F 2203/1032; F24F 2303/1068; F24F 2303/1092
USPC .............. 62/94, 271, 419, 176.6, 93; 165/54; 95/11, 113
See application file for complete search history.

(56) References Cited

U.S. PATENT DOCUMENTS 4,113,004 A * 9/1978 Rush et al. .................. 165/7
5,931,015 A * 8/1999 Maeda ..................... 62/271
(Continued)

FOREIGN PATENT DOCUMENTS

| EP | 1 666 803 A1 | 6/2006 | |
|---|---|---|---|
| JP | 05-200233 A | 8/1993 | |
| JP | 10019412 | * 1/1998 | ............. F25B 24/00 |
| JP | 2001074274 A | * 3/2001 | ............... F24F 3/14 |
| JP | 2001-205037 A | 7/2001 | |

(Continued)

*Primary Examiner* — Frantz Jules
*Assistant Examiner* — Emmanuel Duke
(74) *Attorney, Agent, or Firm* — Marvin A. Motsenbocker; Mots Law, PLLC

(57) ABSTRACT

A desiccant air conditioner includes an intake path that introduces air SA from outdoors to indoors, an exhaust path that exhausts air RA from indoors to outdoors, a desiccant rotor adapted to perform dehumidification by adsorbing moisture in air SA flowing through the intake path and regenerate dehumidifying capacity by releasing moisture into air RA flowing through the exhaust path, heating heat exchangers that heat air RA in the exhaust path, and a sensible heat exchanger that performs heat exchange between air RA flowing through the intake path and air SA flowing through the exhaust path, wherein two dehumidification regions, the first dehumidification region and the second dehumidification region, through which air in the intake path passes and two regeneration regions, the first regeneration region and the second regeneration region, through which the air RA in the exhaust path passes are alternately formed in the desiccant rotor.

10 Claims, 7 Drawing Sheets

(56) References Cited

U.S. PATENT DOCUMENTS

| | | | |
|---|---|---|---|
| 6,318,106 B1 * | 11/2001 | Maeda | 62/271 |
| 6,370,900 B1 * | 4/2002 | Maeda | 62/271 |
| 6,575,228 B1 | 6/2003 | Ragland et al. | |
| 7,690,582 B2 | 4/2010 | Matsui et al. | |
| 2002/0116934 A1 * | 8/2002 | Dinnage et al. | 62/93 |
| 2003/0121271 A1 * | 7/2003 | Dinnage et al. | 62/94 |
| 2004/0194490 A1 | 10/2004 | Lee et al. | |
| 2006/0201182 A1 * | 9/2006 | Moon et al. | 62/271 |

FOREIGN PATENT DOCUMENTS

| | | | | |
|---|---|---|---|---|
| JP | 2002-066248 A | | 3/2002 | |
| JP | 2002-317997 A | | 10/2002 | |
| JP | 2003-144831 A | | 5/2003 | |
| JP | 2004076970 | * | 3/2004 | F24F 3/147 |
| JP | 2007-024377 A | | 2/2007 | |
| JP | 2007-029864 A | | 2/2007 | |
| JP | 2007029864 | * | 2/2007 | F24F 3/14 |
| WO | 01/71260 A1 | | 9/2001 | |

* cited by examiner

DESICCANT AIR CONDITIONER

TECHNICAL FIELD

The present invention relates to a desiccant air conditioner that utilizes dehumidification and sensible heat exchange.

BACKGROUND ART

Desiccant air conditioners are attracting attention as future air conditioners, because, unlike cooling-based dehumidification systems, desiccant air conditioners cool the air after dehumidifying it and so do not cause the growth of mold and bacteria, and what is more, desiccant air conditioners do not use chlorofluorocarbons.

FIG. 7 shows the configuration of a commonly-used desiccant air conditioner "a". That is to say, in the desiccant air conditioner "a", an intake path "b" that passes air SA from outdoors to indoors and an exhaust path "c" that passes air RA from indoors to outdoors are provided adjacent to each other in a counterflow manner so that the airs SA and RA flow in opposite directions, and a desiccant rotor "d" and a sensible heat rotor "e" are provided such that these rotors straddle the intake path "b" and the exhaust path "c". The air SA that has been taken into the intake path "b" from outdoors is dehumidified by the desiccant rotor "d" and then cooled by the sensible heat rotor "e" before being supplied indoors. On the other hand, the air RA that has been taken into the exhaust path "c" from indoors is heat-recovered by the sensible heat rotor "e", then further heated by a heater "f", and then absorbs moisture from the desiccant rotor "d" before being exhausted outdoors.

In this case, the desiccant rotor "d" is formed in a disk shape from a moisture absorbent material and thus has air permeability, and this rotor is provided perpendicular to the flows of the airs SA and RA in the intake path "b" and the exhaust path "c" and configured to rotate and come into contact alternately with the airs SA and RA passing through the intake path "b" and the exhaust path "c" to repeat sorption (moisture absorption) and desorption (moisture release). That is to say, although the desiccant rotor "d" absorbs moisture from the air SA passing through the intake path "b", once the rotor "d" has rotated and thus moved to the exhaust path "c", the rotor releases moisture into the air RA passing through this exhaust path "c" and is dried. As a result, the dehumidifying capacity of the rotor is regenerated. Then, the desiccant rotor "d" rotates again and thus moves to the intake path "b". After that, the rotor repeats the same operation as described above over and over again.

In the desiccant air conditioner "a" as described above, the dehumidifying capacity depends on the performance of the desiccant rotor "d", and therefore there has been a limitation to the ability to adjust humidity and temperature. In particular, since the desiccant rotor "d" generates heat of moisture absorption when absorbing moisture from the air SA passing through the intake path "b", the moisture absorbing capacity decreases, and so there has also been a limitation to the ability to increase the dryness.

Thus, conventionally, in order to enhance the dehumidifying capacity, which depends on the desiccant rotor, there have been proposed desiccant air conditioners including a desiccant air conditioner that employs a desiccant rotor having two dehumidification regions through which the air in the intake path passes and one regeneration region through which the air in the exhaust path passes, as disclosed in Patent Document 1.

In this desiccant air conditioner, the air from the intake path is guided to the desiccant rotor and dehumidified in the first dehumidification region, then guided to a heat exchanger and cooled by heat exchange with the air from the exhaust path, then guided to the desiccant rotor and dehumidified in the second dehumidification region, then cooled by heat exchange with a low-temperature heat source of a heat pump, and afterward supplied indoors. Moreover, the air from the exhaust path is heated by heat exchange with the air from the intake path, then further heated by a heat source of the heat pump, and then guided to the desiccant rotor and heats the regeneration region to cause moisture retained by this regeneration region to be released, thereby regenerating the moisture absorbing capacity of the desiccant rotor.

Moreover, another example of the desiccant air conditioners that have been proposed is a desiccant air conditioner that employs a desiccant rotor having one dehumidification region through which the air in the intake path passes and two regeneration regions through which the air in the exhaust path passes, as disclosed in Patent Document 2.

In this desiccant air conditioner, the air from the intake path is guided to the desiccant rotor and dehumidified in the dehumidification region, then guided to a heat exchanger and cooled by heat exchange with the air from the exhaust path, then cooled by heat exchange with a low-temperature heat source of a heat pump, and afterward supplied indoors. Moreover, the air from the exhaust path is heated by heat exchange with the air from the intake path, then further heated by a heat source of the heat pump, and then divided into two branches. The air passing through one branched path is guided to the desiccant rotor and heats the first regeneration region to cause moisture retained by this first regeneration region to be released, thereby regenerating the moisture absorbing capacity of the desiccant rotor. The air passing through the other branched path is heated even further by the heat source of the heat pump, then guided to the desiccant rotor and regenerates the second regeneration region.

DISCLOSURE OF THE INVENTION

Problem to be Solved by the Invention

However, in the case of the desiccant air conditioner disclosed in Patent Document 1, since the first dehumidification region and the second dehumidification region are adjacent to each other, the first dehumidification region whose dehumidifying capacity has been reduced by passage of the air from the intake path is moved to the second dehumidification region by rotation of the desiccant rotor with the dehumidifying capacity still in the reduced state. Thus, when the air from the intake path passes through this second dehumidification region, the desiccant rotor cannot provide a sufficient dehumidifying capacity.

Furthermore, in the case of the desiccant air conditioner disclosed in Patent Document 2, the first regeneration region whose dehumidifying capacity has been regenerated by the air heated by the heat source of the heat pump and passing through the one branched path is moved to the second regeneration region by rotation of the desiccant rotor with the dehumidifying capacity still in the regenerated state. Therefore, in order for the desiccant rotor to obtain a sufficient dehumidifying capacity in the second regeneration region, it is necessary that the air passing through the other branched path be heated even further by the heat source of the heat pump, and this increases the complexity of the structure. Moreover, even though the configuration in which the air passing through the other branched path is heated even further by the heat source of the heat pump is employed, the division of the air from the exhaust path into the branches for the two regeneration regions reduces the air flow rate in each regeneration region, and thus a sufficient regenerating capacity cannot be exhibited.

The present invention has been made in view of these circumstances, and it is an object thereof to provide a desiccant air conditioner that has a simple configuration and that can allow a desiccant rotor to effectively exhibit its dehumidifying capacity.

Means for Solving the Problem

A desiccant air conditioner of the present invention for solving the above-described problems is a desiccant air conditioner including an intake path that introduces air from outdoors to indoors; an exhaust path that exhausts air from indoors to outdoors; a desiccant rotor adapted to perform dehumidification by adsorbing moisture in the air flowing through the intake path and regenerate a dehumidifying capacity by releasing moisture into the air flowing through the exhaust path; heating heat exchangers that heat the air in the exhaust path; and a sensible heat exchanger that performs heat exchange between the air flowing through the intake path and the air flowing through the exhaust path, wherein two dehumidification regions through which the air in the intake path passes and two regeneration regions through which the air in the exhaust path passes are alternately formed in the desiccant rotor.

The air flowing through the intake path may flow through the two dehumidification regions in series, and the air flowing through the exhaust path flow through the two regeneration regions in series.

Air flow directions in the two dehumidification regions may be set to the same direction, air flow directions in the two regeneration regions set to the same direction, and the air flow direction in the dehumidification regions and the air flow direction in the regeneration regions set to opposite directions.

The air that has emerged from the dehumidification region on an upstream side may decrease in temperature by heat exchange with the air flowing through the exhaust path or outside air or by heat exchange with a separately supplied low-temperature refrigerant or cooling water before flowing into the dehumidification region on a downstream side.

The air that has emerged from the regeneration region on an upstream side may be heated by a hot water heat exchanger, a gas burner, or an electric heater before flowing into the regeneration region on a downstream side.

The desiccant rotor may be formed in a ring shape in which a penetrating path penetrating the desiccant rotor is formed in a center of the desiccant rotor, and the air moving from the regeneration region on the upstream side toward the regeneration region on the downstream side flow through the penetrating path.

A heat exchanger that reheats the air flowing through the exhaust path may be provided in the penetrating path.

When priority is given to the dehumidifying capacity, the desiccant rotor may rotate in such a direction that the desiccant rotor moves to the dehumidification region on the downstream side after being regenerated in the regeneration region on the upstream side, and when priority is given to a cooling energy efficiency (COP), the desiccant rotor rotate in such a direction that the desiccant rotor moves to the dehumidification region on the downstream side after being regenerated in the regeneration region on the downstream side.

A difference between temperatures of the air before and after passing through the regeneration regions and/or a difference between humidities of the air before and after passing through the dehumidification regions may be measured, and a direction of rotation of the desiccant rotor reversed when a decrease in the temperature difference and/or in the humidity difference has been detected.

The desiccant air conditioner may be adapted to perform control so that the temperature of the air flowing into the regeneration region on the downstream side is lower than the temperature of the air flowing into the regeneration region on the upstream side.

A heat exchanger for heating during a heating mode may be provided in the intake path between the sensible heat exchanger for sensible heat exchange between the air flowing through the intake path and the air flowing through the exhaust path and the regeneration region on the downstream side, the heat exchanger being adapted to heat and humidify the air flowing through the intake path during the heating mode.

Effects of the Invention

As described above, according to the present invention, since the two dehumidification regions through which the air in the intake path passes and the two regeneration regions through which the air in the exhaust path passes are alternately formed in the desiccant rotor, dehumidification and regeneration can be alternately performed. Therefore, it is possible to allow the desiccant rotor to effectively exhibit its dehumidifying capacity without performing inefficient two-stage dehumidification or two-stage regeneration. Moreover, a simple configuration can be realized simply with a flow path arrangement of the intake path and the exhaust path that supply air to these alternately formed dehumidification regions and regeneration regions.

BEST MODE FOR CARRYING OUT THE INVENTION

Hereinafter, an embodiment of the present invention will be described with reference to the drawings.

Figures 1A, 1B:
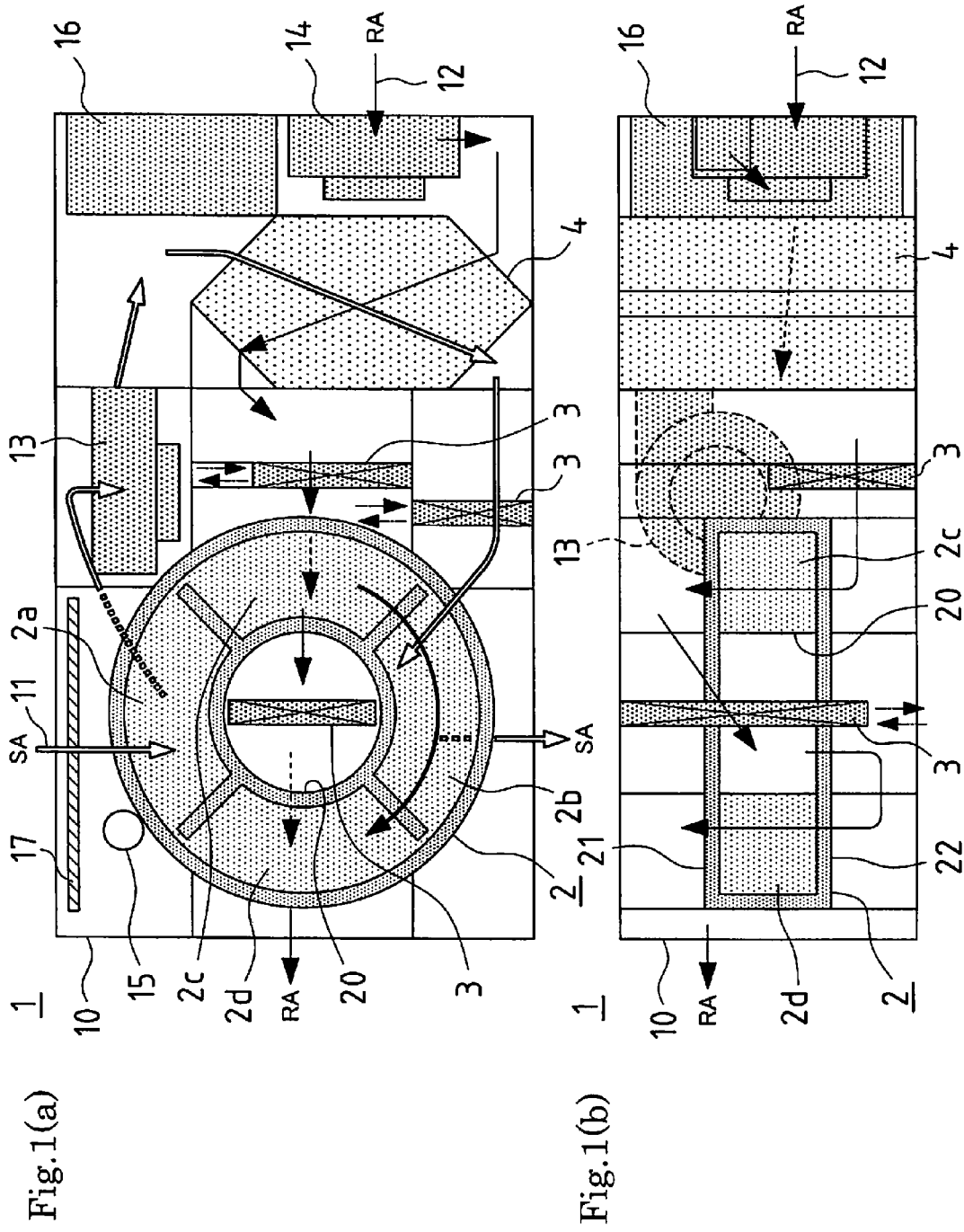
FIG. 1(a) is a schematic configuration diagram of a desiccant air conditioner according the present invention in horizontal cross section.
FIG. 1(b) is a schematic configuration diagram of the desiccant conditioning apparatus in vertical cross section.
Figure 2:
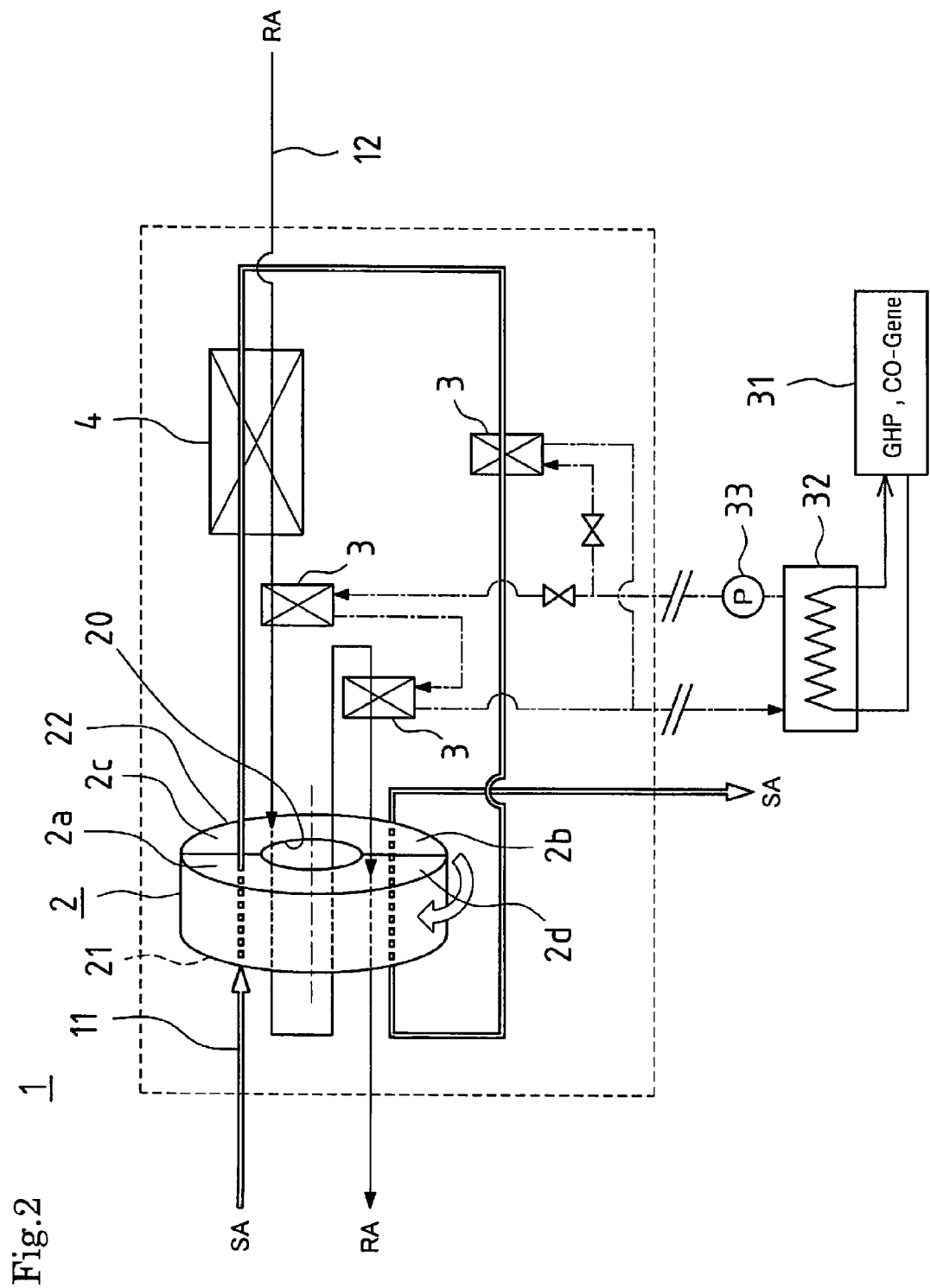
FIG. 2 is a refrigerant circuit diagram for schematically illustrating the overall configuration of the desiccant air conditioner according to the present invention.
Figure 3:
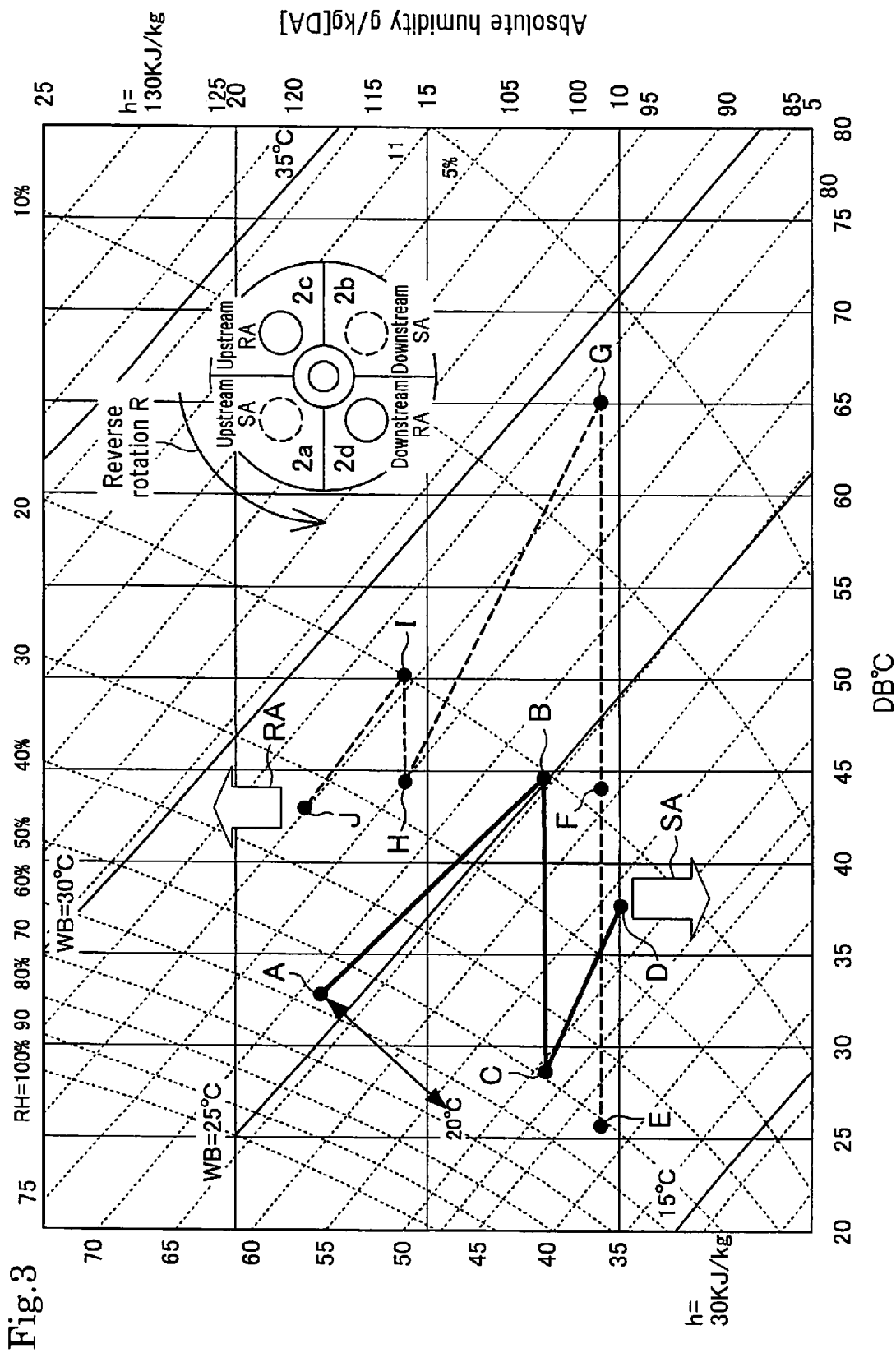
FIG. 3 is a psychrometric chart showing the characteristics of exhaust air and intake air during operation in a cooling mode of the desiccant air conditioner according to the present invention.

FIG. 1 schematically shows the overall configuration of a desiccant air conditioner 1 according to the present invention, FIG. 2 shows a refrigerant circuit of the desiccant air conditioner 1, and FIG. 3 shows a psychrometric chart when the desiccant air conditioner 1 is operated in a cooling mode.

That is to say, this desiccant air conditioner 1 includes an intake path 11 that introduces air SA from outdoors to indoors, an exhaust path 12 that exhausts air RA from indoors to outdoors, a desiccant rotor 2 adapted to perform dehumidification by adsorbing moisture in the air SA flowing through the intake path 11 and regenerate the dehumidifying capacity by releasing moisture into the air RA flowing through the exhaust path 12, heating heat exchangers 3 that heat the air RA in the exhaust path 12, and a sensible heat exchanger 4 that performs heat exchange between the air SA flowing through the intake path 11 and the air RA flowing through the exhaust path 12. A first dehumidification region 2a and a second dehumidification region 2b through which the air SA in the intake path 11 passes and a first regeneration region 2c and a second regeneration region 2d through which the air RA in the exhaust path 12 passes are formed in the desiccant rotor 2 in such a manner that these regions are alternately arranged.

The desiccant air conditioner 1 is configured so as to fit within a casing 10 having a length of 1370 mm, a width of 820 mm, and a height of 460 mm, and the flows of the air SA in the intake path 11 and the air RA in the exhaust path 12 are formed by fans 13 and 14 provided in the intake path 11 and the exhaust path 12, respectively. The desiccant rotor 2 can be rotated freely in normal and reverse directions by driving a motor 15 meshing with an outer peripheral edge portion of the rotor. Driving of the fans 13 and 14 and the motor 15 is controlled by a controller 16. The air SA introduced into the intake path 11 from outdoors is purified by a purification filter 17.

There is no particular limitation to the material for the desiccant rotor 2, and any material can be suitably used as long as it is a sorbent and desorbent material for use in the ordinary desiccant air conditioner 1. Specific examples thereof include synthetic materials including silica gel and a cross-linked polyacrylate material having high moisture absorption and release properties, and natural materials including silica-alumina desiccants and ceramic desiccants such as molecular sieves. Among these, in particular, the cross-linked polyacrylate material having high moisture absorption and release properties produced from an acrylic fiber by hydrolyzing part of the nitrile groups to generate amide groups and carboxylic acid groups and, furthermore, cross-linking part of the remaining nitrile groups with hydrazine or the like can exhibit excellent sorption properties and desorption properties. Regarding the definition of the cross-linked polyacrylate material having high moisture absorption and release properties, there is no limitation as long as the material can be used for the desiccant rotor 2 particularly of this type. However, usually, in the case of employing a cross-linked polyacrylate material having high moisture absorption and release properties in which the nitrogen content has increased by 1.0 to 10.0 wt % as a result of cross-linking with hydrazine, 1.0 to 5.0 mmol/g of carboxylic acid groups has been introduced, and amide groups have been introduced into the balance, this material has pH buffering ability to consistently maintain the pH at 7.5 to 8.0 and also has antibacterial properties, deodorizing ability, and the like, and can therefore be suitably used.

This desiccant rotor 2 has a ring shape in which a penetrating path 20 penetrating the desiccant rotor 2 is formed in the center of a thick disk, and the air RA moving from the first regeneration region 2c on the upstream side toward the second regeneration region 2d on the downstream side flows through this penetrating path 20. In the desiccant rotor 2, the dehumidification regions 2a and 2b and the regeneration regions 2c and 2d are alternately provided in a circumferential direction so that the first dehumidification region 2a is opposed to the second dehumidification region 2b and the first regeneration region 2c is opposed to the second regeneration region 2d. In the first dehumidification region 2a and the second dehumidification region 2b, the air SA passes from a side 21 to another side 22 of the desiccant rotor 2, and in the first regeneration region 2c and the second regeneration region 2d, the air RA passes from the side 22 to the side 21 of the desiccant rotor 2.

The desiccant rotor 2 moves in the order of the first dehumidification region 2a, the first regeneration region 2c, the second dehumidification region 2b, and the second regeneration region 2d when rotated in a normal rotation direction N by driving the motor 15, and moves in the order of the first dehumidification region 2a, the second regeneration region 2d, the second dehumidification region 2b, and the first regeneration region 2c when rotated in a reverse rotation direction R.

The heating heat exchangers 3 are configured so that heat recovered from a heat source 31 of a cogeneration system or a gas heat pump by an engine exhaust heat recovery device 32 is circulated and supplied by a pump 33. The heating heat exchangers 3 are provided at three positions, that is, two heating heat exchangers 3 are provided in the exhaust path 12, and one heating heat exchanger 3 is provided in the intake path 11. One of the heating heat exchangers 3 provided in the exhaust path 12 is provided in a path between the sensible heat exchanger 4 that will be described later and the desiccant rotor 2. The other heating heat exchanger 3 is disposed in the penetrating path 20 of the desiccant rotor 2 and provided in a path between the first regeneration region 2c and the second regeneration region 2d of the desiccant rotor 2. The heat exchanger 3 provided in the intake path 11 is provided in a path between the sensible heat exchanger 4 that will be described later and the second dehumidification region 2b of the desiccant rotor 2.

It should be noted that in the present embodiment, the heating heat exchangers 3 are configured so that heat that has been recovered from the heat source 31 of the cogeneration system or the gas heat pump by the engine exhaust heat recovery device 32 is circulated and supplied by the pump 33. However, there is no particular limitation to the heating heat exchangers 3 as long as they can heat the air SA in the intake path 11 or the air RA in the exhaust path 12, and an electric heater (not shown) or a gas burner (not shown) may also be adopted.

The sensible heat exchanger 4 is adapted to perform heat exchange between the air SA passing through the intake path 11 and the air RA passing through the exhaust path 12, and provided in an area located in the middle of a portion of the exhaust path 12 from an entrance of the exhaust path 12 from indoors to the heat exchanger 3 and in the middle of a portion of the intake path 11 from an exit of the first dehumidification region 2a to the heat exchanger 3.

Next, an operation during a cooling mode of the desiccant air conditioner 1 having the configuration as described above will be described with reference to the psychrometric chart in FIG. 3. It should be noted that in a cooling mode, the recovered heat is not supplied to the heating heat exchanger 3 provided in the intake path 11, and the recovered heat is only supplied to the heating heat exchangers 3 provided in the exhaust path 12. Moreover, it is assumed that the desiccant rotor 2 is rotating in the reverse rotation direction R.

The air SA that has been introduced into the intake path 11 from outdoors (state A) is dehumidified in the first dehumidification region 2a of the desiccant rotor 2 and increased in temperature due to heat of adsorption that is generated when moisture in the air SA is adsorbed by the desiccant rotor 2 (state B).

The air SA thus dehumidified and increased in temperature (state B) is directed to the sensible heat exchanger 4 and cooled by heat exchange with the air RA passing through the exhaust path 12 from indoors (state C).

The cooled air SA is again dehumidified in the second dehumidification region 2b of the desiccant rotor 2, decreased in humidity even further, and then supplied indoors (state D). During dehumidification in this second dehumidification region 2b, dehumidification in the second dehumidification region 2b can be effectively performed because, between dehumidification in the first dehumidification region 2a and dehumidification in this second dehumidification region 2b, removal of moisture that has been adsorbed by the desiccant rotor 2 in the later-described second regeneration region 2d is performed to regenerate the dehumidifying capacity. Moreover, during dehumidification in the second dehumidification region 2b, the temperature of the air SA increases again due to heat of adsorption, but since the humidity itself of the air SA has sufficiently decreased as a result of dehumidification in the preceding first dehumidification region 2a, the increase in temperature of the air SA due to heat of adsorption in this second dehumidification region 2b can be suppressed to a smaller value than the increase in temperature of the air SA due to heat of adsorption in the first dehumidification region 2a.

It should be noted that if the cooling capacity is to be further enhanced, the air SA after passing through the second dehumidification region 2b may be further cooled with a cooling device (not shown) of another heat pump cycle before being supplied indoors. Moreover, in this case, the locations of the cooling device (not shown) and the sensible heat exchanger 4 may also be interchanged so that cooling by the cooling device (not shown) and cooling by the sensible heat exchanger 4 are performed in reverse order.

On the other hand, the indoor air RA that has been introduced into the exhaust path 12 (state E) is directed to the sensible heat exchanger 4, where the air RA cools the air SA passing through the intake path 11 from outdoors and the temperature of the air RA itself increases (state F). The air RA whose temperature has increased (state F) is directed further to the heating heat exchanger 3, where the air RA is heated and the temperature thereof increases (state G).

The air RA whose temperature has thus increased (state G) passes through the first regeneration region 2c of the desiccant rotor 2 and removes moisture adsorbed by the desiccant rotor 2, thereby regenerating the desiccant rotor 2.

The air RA that has absorbed moisture as a result of regeneration (state H) is then further heated by the other heating heat exchanger 3 (state I), and subsequently passes through the second regeneration region 2d, and, in this second regeneration region 2d as well, removes moisture adsorbed by the desiccant rotor 2, thereby regenerating the desiccant rotor 2. The air RA that has absorbed moisture after regeneration (state J) is exhausted outdoors.

In this case, since the desiccant rotor 2 moves in the order of the first dehumidification region 2a, the second regeneration region 2d, the second dehumidification region 2b, and the first regeneration region 2c when rotated in the reverse rotation direction R by rotating the motor 15, the desiccant rotor 2 after passing through the second dehumidification region 2b can be regenerated in the first regeneration region 2c, and the desiccant rotor 2 after passing through the first dehumidification region 2a can be regenerated in the second regeneration region 2d. Thus, the air RA does not successively pass through the first regeneration region 2c and the second regeneration region 2d. Therefore, it is possible to effectively regenerate the desiccant rotor 2 by two-stage regeneration.

Moreover, since the air SA passing through the intake path 11 is dehumidified in the first dehumidification region 2a using the desiccant rotor 2 that has been regenerated in the first regeneration region 2c, and dehumidified in the second dehumidification region 2b using the desiccant rotor 2 that has been regenerated in the second regeneration region 2d, the air SA does not successively pass through the first dehumidification region 2a and the second dehumidification region 2b. Therefore, it is possible to effectively dehumidify the air SA by two-stage dehumidification.

It should be noted that the above-described effects of two-stage regeneration and two-stage dehumidification can be obtained not only in the case where the desiccant rotor 2 is rotated in the reverse rotation direction R but also in the case where the rotor is rotated in the normal rotation direction N.

Moreover, the excellent dehumidifying capacity and regenerating capacity of the desiccant rotor 2 according to this desiccant air conditioner 1 can be easily obtained simply with a flow path configuration consisting of the intake path 11 that supplies the air SA to the first dehumidification region 2a and the second dehumidification region 2b and the exhaust path 12 that supplies the air RA to the first regeneration region 2c and the second regeneration region 2d. Therefore, it is possible to form a desiccant air conditioner that has a reduced size as described above and is installable in spaces such as an attic, an underfloor space, and the inside of a wall of a house. It should be noted that there is no particular limitation to the size of the desiccant air conditioner 1, and the size can be designed as appropriate in accordance with the air-conditioning capacity, the air volume, and the like required for an indoor environment. Moreover, in the case of the desiccant air conditioner 1 shown in FIG. 1, the air RA moving from the first regeneration region 2c on the upstream side toward the second regeneration region 2d on the downstream side flows through the penetrating path 20 provided in the desiccant rotor 2, and furthermore, the heating heat exchanger 3 is provided in the penetrating path 20. This facilitates flow path routing and fitting of the heating heat exchanger 3 and allows an even more compact design.

Figure 4:
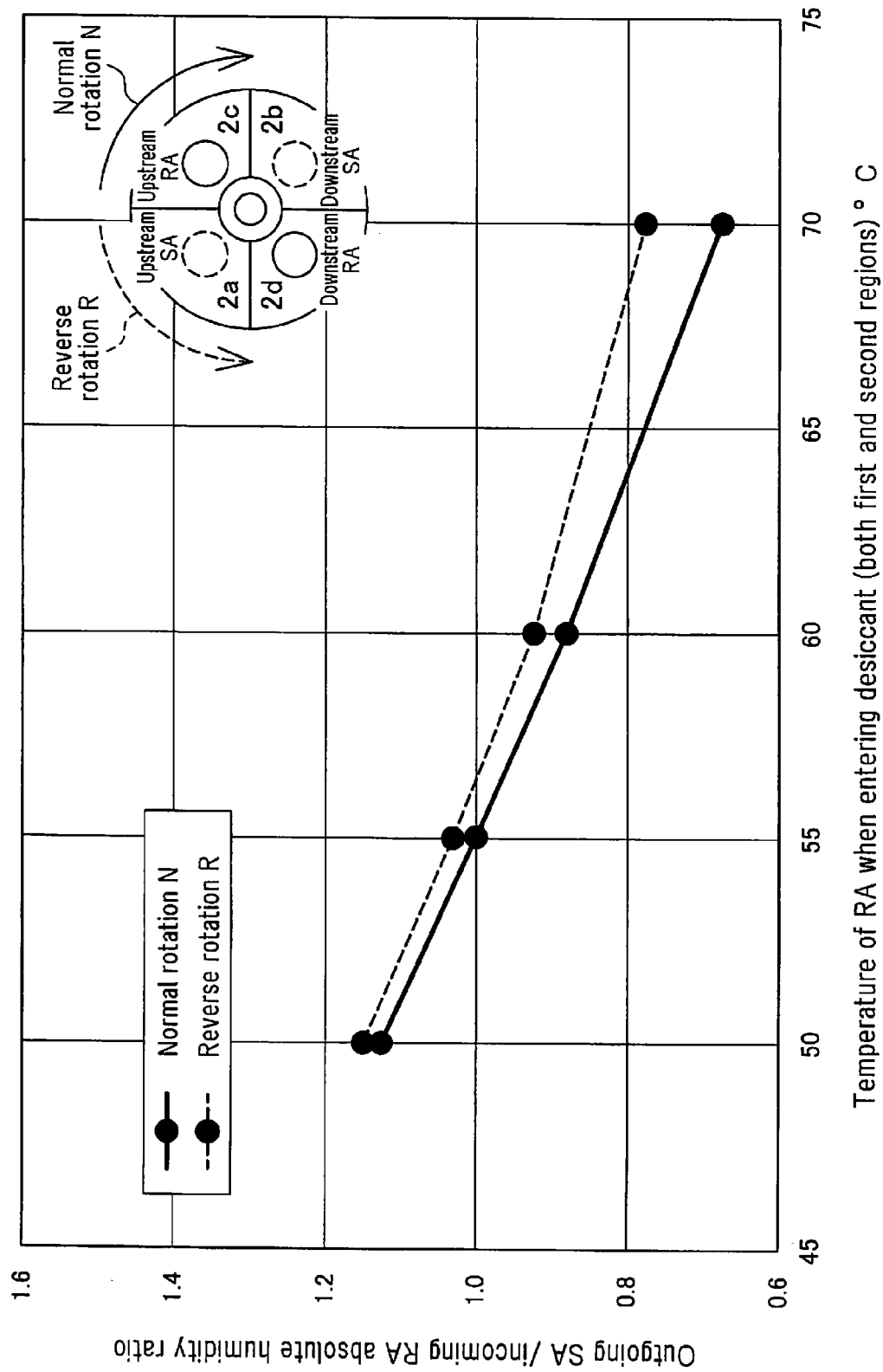
FIG. 4 is a graph showing the relationship between dehumidifying capacity and air temperature with respect to different directions of rotation of a desiccant rotor.

FIG. 4 shows the relationship between the absolute humidity of the air SA when supplied indoors after being introduced into the intake path 11 and dehumidified and the temperature of the air RA during passage through the desiccant rotor 2 after being introduced into the exhaust path 12 from indoors and heated. As can be seen from this graph, in the case where the desiccant rotor 2 is rotated in the normal rotation direction N, a superior dehumidifying capacity to that in the case where the direction of rotation is the reverse rotation direction R can be obtained. In particular, the higher the temperature of the air RA during passage through the desiccant rotor 2, the superior the dehumidifying capacity that can be obtained.

Figure 5:
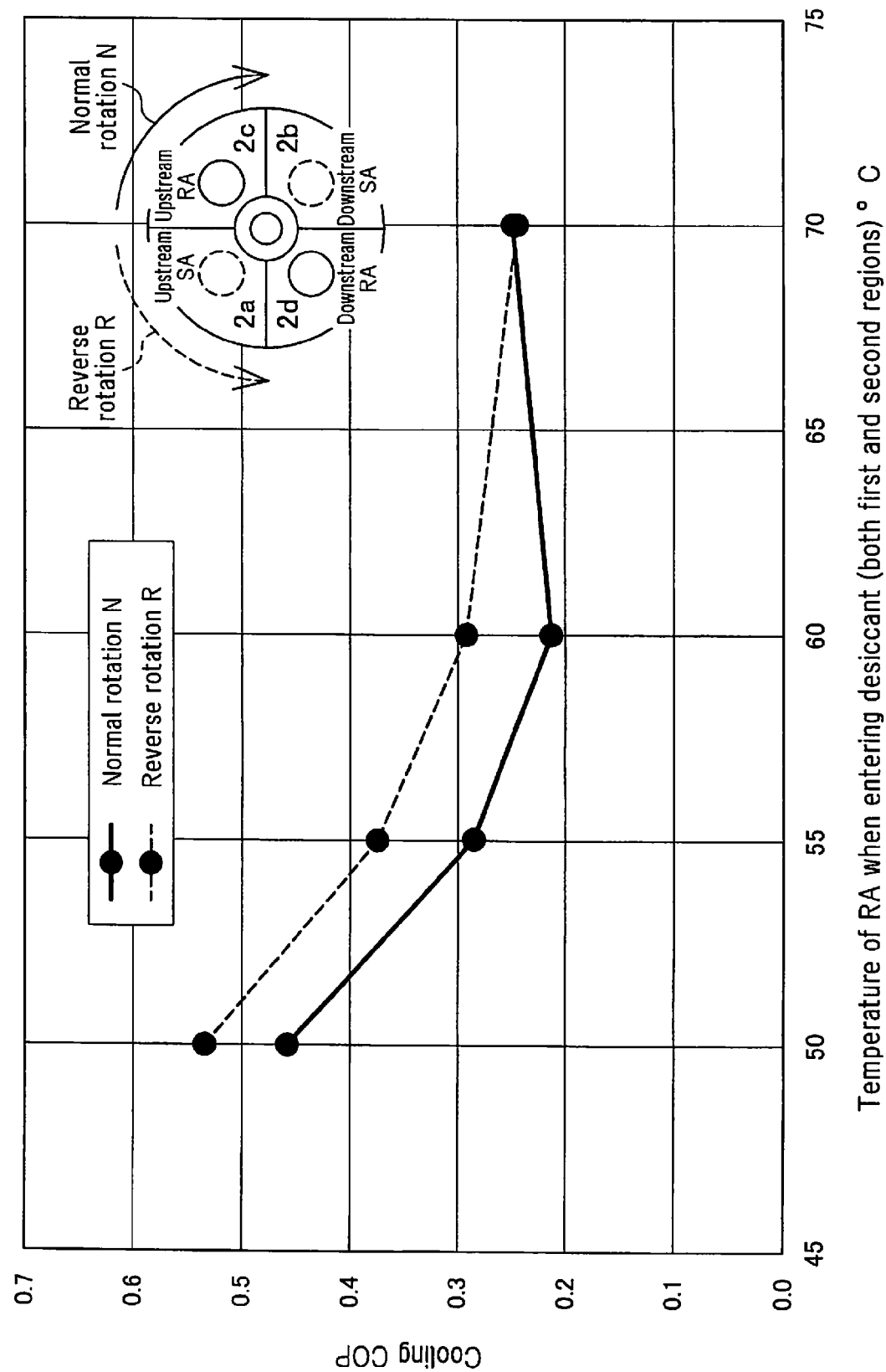
FIG. 5 is a graph showing the relationship between cooling energy efficiency and air temperature with respect to the different directions of rotation of the desiccant rotor.

Moreover, FIG. 5 shows the relationship between the cooling energy efficiency (COP) of the desiccant air conditioner 1 and the temperature of the air RA during passage through the desiccant rotor 2 after being introduced into the exhaust path 12 from indoors and heated. As can be seen from this graph, in the case where the desiccant rotor 2 is rotated in the reverse rotation direction R, a superior energy efficiency to that in the case where the direction of rotation is the normal rotation direction N can be obtained. In particular, the lower the temperature of the air RA during passage through the desiccant rotor 2, the superior the energy efficiency that can be obtained.

As described above, in the case where priority is given to dehumidification, an excellent dehumidifying capacity can be exhibited by rotating the desiccant rotor 2 in the normal rotation direction N, and in the case where priority is given to the energy efficiency, an excellent energy efficiency can be exhibited by rotating the desiccant rotor 2 in the reverse rotation direction R. Therefore, it is possible to perform an optimal operation depending on the use environment or the situation by changing the direction of rotation of the desiccant rotor 2 of the desiccant air conditioner 1 as appropriate.

Figure 6:
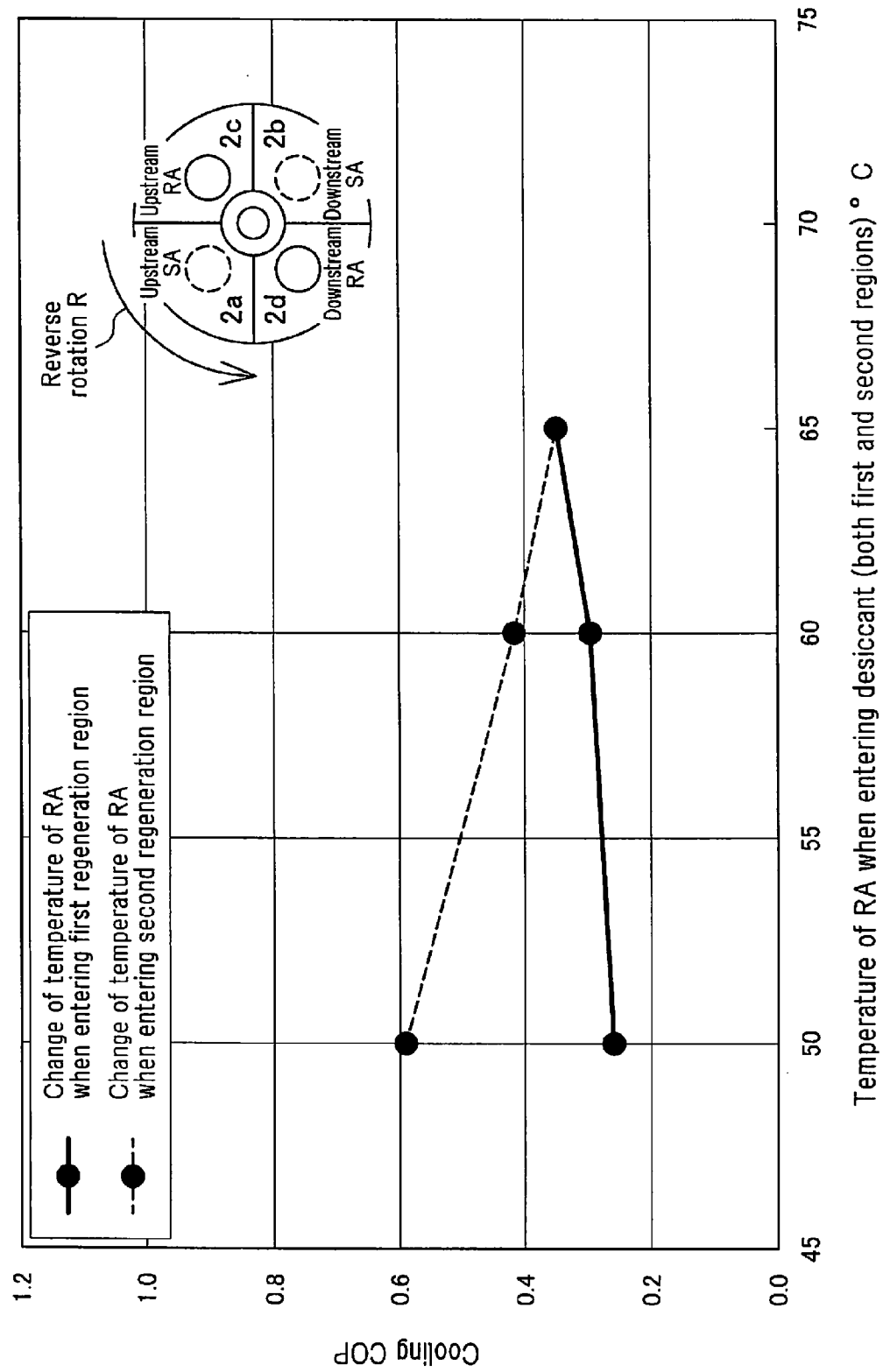
FIG. 6 is a graph showing the relationship between temperature change of intake air or exhaust air passing through the desiccant rotor and cooling energy efficiency.
Figure 7:
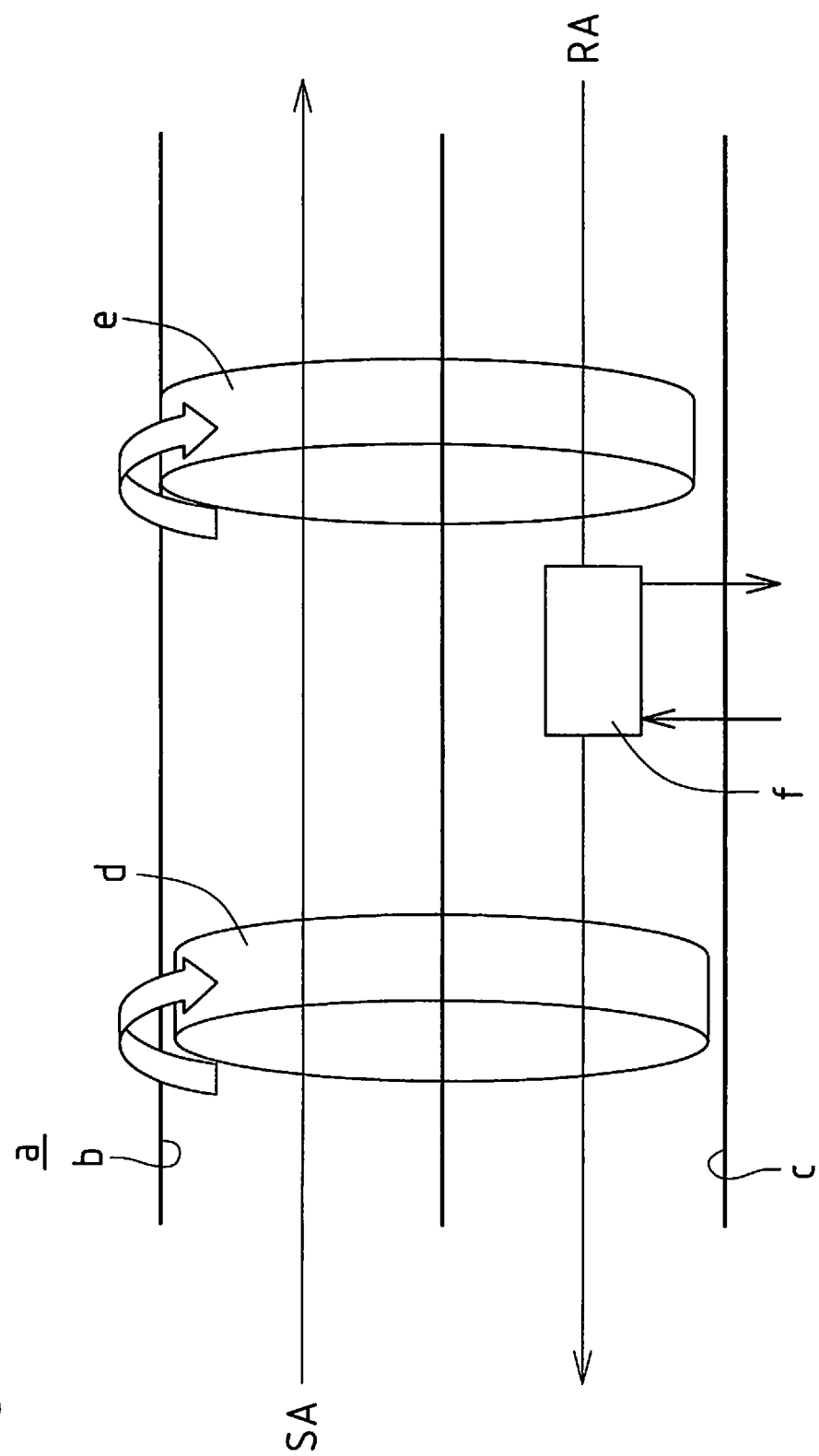
FIG. 7 is a schematic explanatory diagram showing the overall configuration of a conventional desiccant air conditioner.

FIG. 6 shows the relationship between the cooling energy efficiency (COP) of the desiccant air conditioner 1 and the temperature of the air RA during passage through the desiccant rotor 2 after being introduced into the exhaust path 12 from indoors and heated. As can also be seen from this graph, concerning the temperature of the air RA during passage through the desiccant rotor 2, with respect to the state in which the temperature of the air RA during passage through the first regeneration region 2c and that of the air RA during passage through second regeneration region 2d are set to the same temperature, in the case where the temperature of the air RA during passage through the first regeneration region 2c is decreased, the cooling energy efficiency is not enhanced, whereas in the case where the temperature of the air RA during passage through the second regeneration region 2d is decreased, the energy efficiency is significantly enhanced. Therefore, when the cooling energy efficiency is to be enhanced further with respect to that in a normal operation state, the enhancement can be realized by decreasing the temperature of the air RA during passage through the second regeneration region 2d. The control of the temperature of the air RA during passage through the first regeneration region 2c and during passage through the second regeneration region 2d may be combined with the above-described control of the direction of rotation of the desiccant rotor 2.

Next, an operation during a heating mode of the desiccant air conditioner 1 will be described. During a heating mode, the desiccant air conditioner 1 does not supply the recovered heat to the heating heat exchangers 3 provided in the exhaust path 12 and only supplies the recovered heat to the heating heat exchanger 3 provided in the intake path 11.

The air RA that has been introduced into the exhaust path 12 from indoors is directed to the sensible heat exchanger 4, where the air RA is cooled by heat exchange with the low-temperature air SA passing through the intake path 11 from outdoors. When the air RA whose relative humidity has been increased by this cooling passes through the first regeneration region 2c and the second regeneration region 2d of the desiccant rotor 2, moisture in the air RA is adsorbed by the first regeneration region 2c and the second regeneration region 2d, and then the air RA is exhausted outdoors. On the other hand, the low-temperature air SA that has been introduced into the intake path 11 from outdoors passes through the first dehumidification region 2a of the desiccant rotor 2 and is then directed to the sensible heat exchanger 4, where the air SA is heated by heat exchange with the air RA passing through the exhaust path 12 from indoors. The air SA whose temperature has increased is directed further to the heating heat exchanger 3, where the air SA is heated and the temperature thereof increases. When the air SA whose temperature has thus increased passes through the second dehumidification region 2b of the desiccant rotor 2, the air SA absorbs moisture adsorbed by the desiccant rotor 2 and is humidified, and then supplied indoors.

As described above, during the heating mode, it is possible to recover moisture in the air RA to be exhausted from the exhaust path 12 and humidify the air SA to be supplied indoors from the intake path 11 by merely switching the heating heat exchangers 3, without the need to switch the air flow path from that in the cooling mode.

It should be noted that in the present embodiment, the penetrating path 20 penetrating the desiccant rotor 2 is formed in the center of the desiccant rotor 2, and the air RA moving from the first regeneration region 2c on the upstream side toward the second regeneration region 2d on the downstream side flows through this penetrating path 20. However, the shape of the desiccant rotor 2 is not limited to a shape such as this in which the penetrating path 20 is formed, and may be simply disk-shaped.

INDUSTRIAL APPLICABILITY

The present invention is applicable to a desiccant air conditioner.

DESCRIPTION OF REFERENCE NUMERALS 1 desiccant air conditioner
11 intake path
12 exhaust path
2 desiccant rotor
20 penetrating path
2a first dehumidification region
2b second dehumidification region
2c first regeneration region
2d second regeneration region
3 heating heat exchanger
4 sensible heat exchanger
SA air
RA air
N normal rotation direction
R reverse rotation direction

RELATED ART DOCUMENTS

Patent Document 1: JP 9-318129A
Patent Document 2: JP10-267576A

The invention claimed is:

1. A desiccant air conditioner comprising an intake path that introduces air from outdoors to indoors; an exhaust path that exhausts air from indoors to outdoors; a desiccant rotor adapted to perform dehumidification by adsorbing moisture in the air flowing through the intake path and regenerate a dehumidifying capacity by releasing moisture into the air flowing through the exhaust path; heating heat exchangers that heat the air in the exhaust path; and a sensible heat exchanger that performs heat exchange between the air flowing through the intake path and the air flowing through the exhaust path, wherein two dehumidification regions through which the air in the intake path passes and two regeneration regions through which the air in the exhaust path passes are alternately formed in the desiccant rotor, the air flowing through the intake path flows through the two dehumidification regions in series, and the air flowing through the exhaust path flows through the two regeneration regions in series, the air that has passed through the first regeneration region is further heated by one of the heating heat exchangers and subsequently passes through the second regeneration region, and the air that has passed through the first regeneration region, in an entire amount thereof, is brought back to an inflow surface side of the first regeneration region and then is allowed to flow through the second regeneration region from a same side as the inflow surface side of the first regeneration region.

2. The desiccant air conditioner according to claim 1, wherein air flow directions in the two dehumidification regions are set to the same direction, air flow directions in the two regeneration regions are set to the same direction, and the air flow direction in the dehumidification regions and the air flow direction in the regeneration regions are set to opposite directions.

3. The desiccant air conditioner according to claim 1, wherein the air that has emerged from the dehumidification region on an upstream side decreases in temperature by heat exchange with the air flowing through the exhaust path or outside air or by heat exchange with a separately supplied low-temperature refrigerant or cooling water before flowing into the dehumidification region on a downstream side.

4. The desiccant air conditioner according to claim 1, wherein the air that has emerged from the regeneration region on an upstream side is heated by a hot water heat exchanger, a gas burner, or an electric heater before flowing into the regeneration region on a downstream side.

5. The desiccant air conditioner according to claim 1, wherein the desiccant rotor is formed in a ring shape in which a penetrating path penetrating the desiccant rotor is formed in a center of the desiccant rotor, and the air moving from the regeneration region on the upstream side toward the regeneration region on the downstream side flows through the penetrating path.

6. The desiccant air conditioner according to claim 5, wherein a heat exchanger that reheats the air flowing through the exhaust path is provided in the penetrating path.

7. The desiccant air conditioner according claim 1, wherein when priority is given to the dehumidifying capacity, the desiccant rotor rotates in such a direction that the desiccant rotor moves to the dehumidification region on the downstream side after being regenerated in the regeneration region on the upstream side, and when priority is given to a cooling energy efficiency (COP), the desiccant rotor rotates in such a direction that the desiccant rotor moves to the dehumidification region on the downstream side after being regenerated in the regeneration region on the downstream side.

8. The desiccant air conditioner according to claim 1, wherein a difference between temperatures of the air before and after passing through the regeneration regions and/or a difference between humidities of the air before and after passing through the dehumidification regions is measured, and a direction of rotation of the desiccant rotor is reversed when a decrease in the temperature difference and/or in the humidity difference has been detected.

9. The desiccant air conditioner according to claim 1, wherein the desiccant air conditioner is adapted to perform control so that the temperature of the air flowing into the regeneration region on the downstream side is lower than the temperature of the air flowing into the regeneration region on the upstream side.

10. The desiccant air conditioner according to claim 1, wherein a heat exchanger for heating during a heating mode is provided in the intake path between the sensible heat exchanger for sensible heat exchange between the air flowing through the intake path and the air flowing through the exhaust path and the regeneration region on the downstream side, the heat exchanger being adapted to heat and humidify the air flowing through the intake path during the heating mode.

* * * * *